April 21, 1936.  S. P. VAUGHN  2,037,745
HELICOPTER
Filed Oct. 19, 1934  3 Sheets-Sheet 1
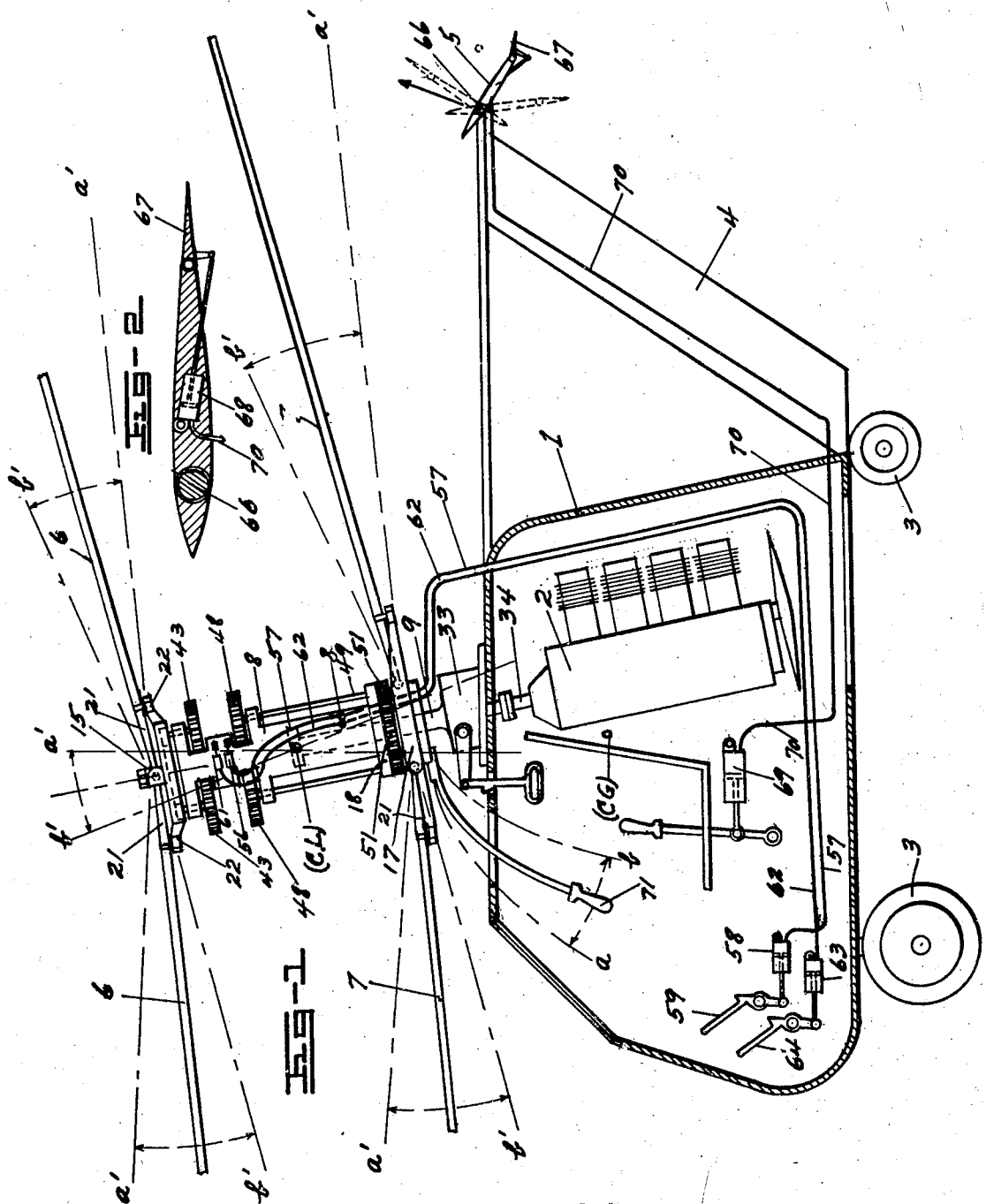
Sidney P. Vaughn
INVENTOR

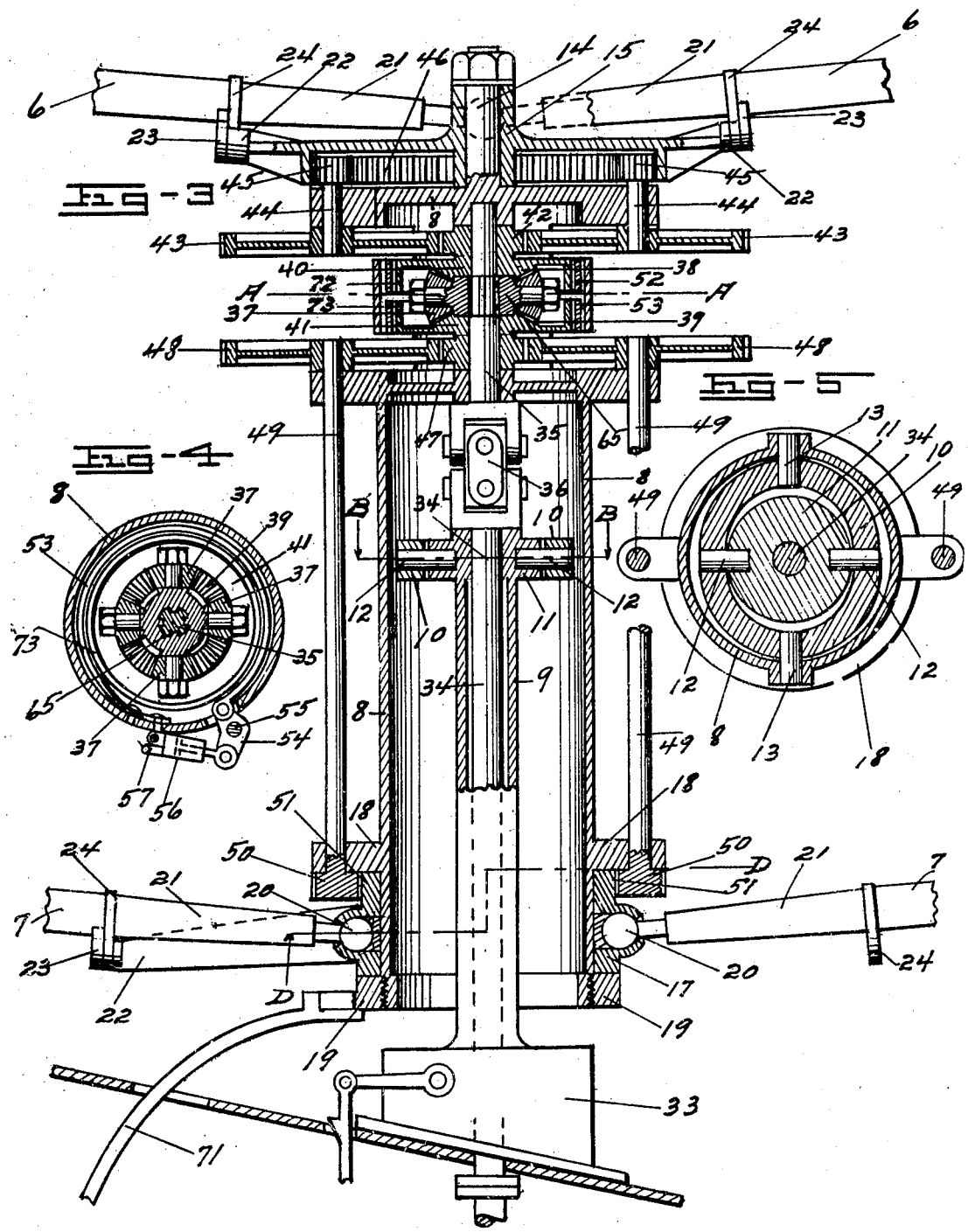

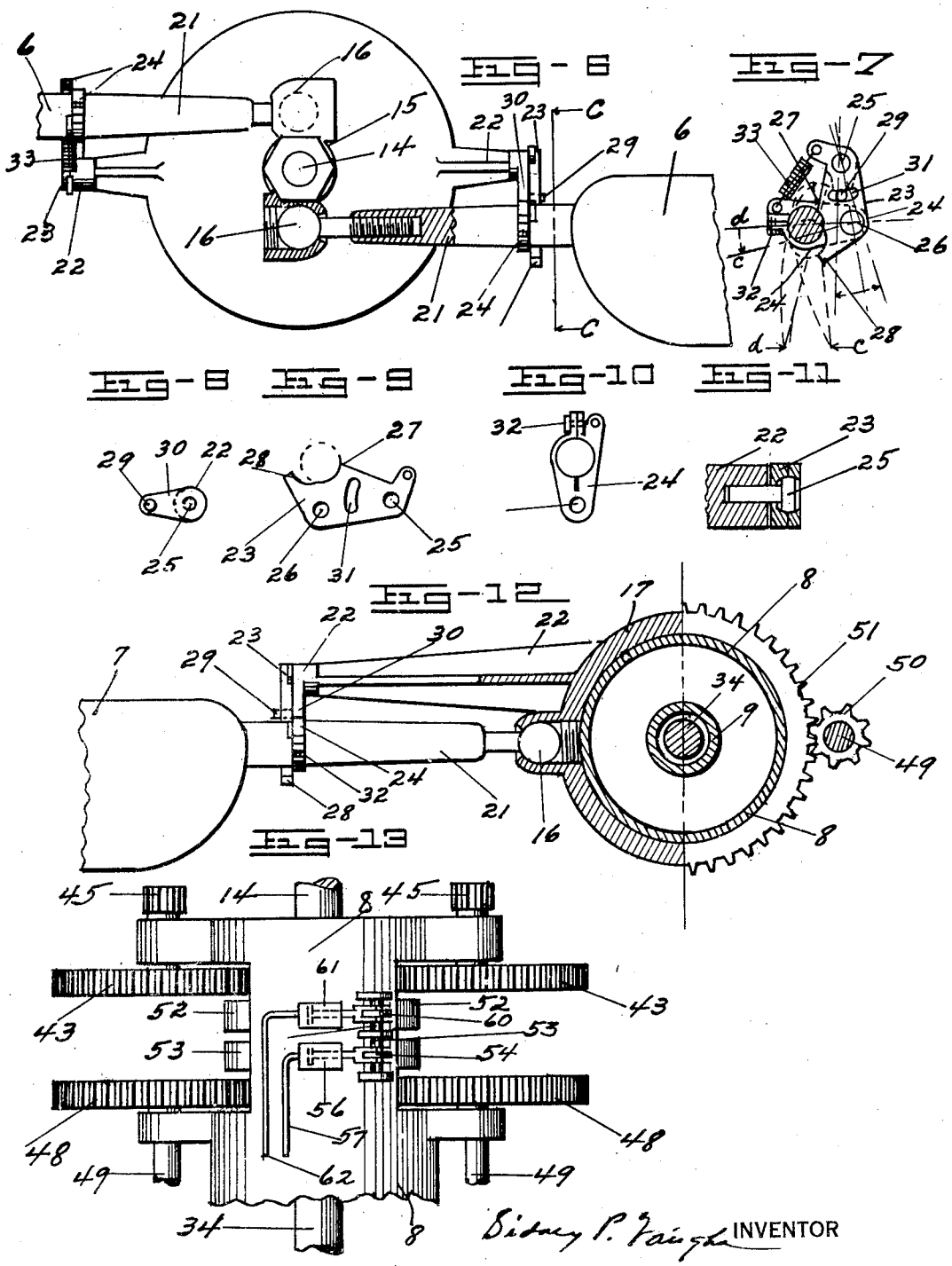

Patented Apr. 21, 1936

2,037,745

UNITED STATES PATENT OFFICE 2,037,745

HELICOPTER

Sidney P. Vaughn, United States Navy, Ackerman, Miss.

Application October 19, 1934, Serial No. 749,060

15 Claims. (Cl. 244—19)

(Granted under the act of March 3, 1883, as amended April 30, 1928; 370 O. G. 757)

This invention relates to aircraft of the helicopter type, but more particularly to propulsion and control means therefor.

Heretofore, certain difficulties have been encountered in obtaining a perfect control for helicopters under all conditions of flight. It is the principal object of this invention to provide means whereby all reacting and gyroscopic torques which tend to upset the stability of the helicopter are balanced or are easily controlled under all conditions of flight.

A further object is to provide what may be termed a true helicopter control which may be manually operated with ease and the helicopter steered in any direction by inclining the axis of rotation of the wing system supporting and propelling the helicopter regardless of whether the engine is running or not running.

A further object is to provide in a helicopter utilizing two oppositely rotating wing systems for sustaining the aircraft and for propulsion, a differential drive whereby the torques applied to each rotating wing system are normally equalized under all conditions of flight, also to provide a novel braking means whereby the torques applied to each wing system may be varied at will and utilized for directional control purposes.

A still further object is to provide an improved rotatable wing system wherein the pitch of the blades are automatically changed to meet all conditions of flight, such as outlined in my Patent No. 1,927,966 to which reference should be made.

In this invention I accomplish my objects by employing two sets of rotating wing systems rotated in opposite directions on the same axis which may be easily inclined in any direction to change the plane of rotation and the direction of thrust. In its simplest form it comprises a tubular axle element with wing systems rotatably mounted on each end and which is universally pivoted to the body of the helicopter, together with means for driving the rotatable wing systems in opposite directions which includes means for equalizing the torques applied as well as means for varying the torques at will for control purposes. In the arrangement set forth herein the reacting and gyroscopic torques are neutralized and the thrust moments acting around the universal pivot are balanced, thus making it possible to change the direction of axis of rotation with a minimum amount of effort.

I obtain the foregoing objects and advantages and others which will occur to those skilled in the art by the construction described herein and illustrated in accompanying drawings, wherein:

Fig. 1 illustrates an elevation of my helicopter in normal flight attitude with body cut away to show position of engine, pilot's seat and control devices.

Fig. 2 is a sectional view of stabilizer or horizontal rudder used for obtaining fore and aft trim in forward flight.

Fig. 3 is a sectional view of the axle member showing how it is universally mounted and how the wing systems are mounted and rotated thereon.

Fig. 4 is a sectional view on line A—A Fig. 3 looking down, and illustrating the differential drive.

Fig 5 is a sectional view on line B—B Fig. 3 looking down, illustrating the universal mounting.

Fig. 6 is a partial plan view of the upper rotatable wing system.

Fig. 7 is a view on line C—C looking toward hub showing linkage assembly connecting end of torque arm with root of blade.

Fig. 8 is an end view of torque arm showing link stop.

Fig. 9 is a side view of link connecting torque arm with depending crank attached to root of blade.

Fig. 10 is a side view of depending crank attached to root of blade.

Fig. 11 is a sectional view of bearing connecting link with torque arm.

Fig. 12 is a sectional view on line D—D Fig. 3 showing lower part of tubular axle and one blade of the lower wing system.

Fig. 13 is a partial side elevation of Fig. 3 showing position of hydraulic engines or motors utilized in the hydraulic braking system to vary torque applied to rotating wing systems.

Like numerals refer to like parts throughout the several views.

Referring to the drawings I have illustrated therein an aircraft of the helicopter type which embodies the general principles of my invention. The helicopter comprises a body 1, an engine 2, landing wheels 3, a weather cock vane 4, a stabilizer or horizontal rudder 5, and two sets of propelling and sustaining rotative wing systems 6 and 7 driven in opposite directions by the engine through a differential drive to be more fully explained herein. The upper wing system is mounted to rotate on the upper end of a tubular axle member 8 and the lower wing system is mounted to rotate upon the lower end of the tubular axle member, the two being so spaced that they do not make contact when rotating. The tubular axle member 8 is universally mounted internally at a point about half way between the upper and lower wing systems to the upper end of a tubular mast 9 extending upwardly from the body and forwardly inclined with reference to the vertical axis of the body. The tubular axle member 8 is arranged concentric with the tubular mast 9 with the lower end of the tubular axle encircling the mast with sufficient annular space between the two to permit tilting the axle member the desired distance on its universal mounting for control purposes as will be more fully explained.

A sectional view (Fig. 5) on line A—A Fig. 3 illustrates the universal mounting. It comprises a ring member 10 pivotally mounted through one diameter to the upper or head end 11 of the tubular mast 9 by pins 12 to rock on an axis parallel with the longitudinal axis of the body. The tubular axle member 8 encircles the ring member 10 and is pivotally mounted thereon by pins 13 to rock on an axis at right angles to the longitudinal axis of the body. The universal mounting of the axle member permits it to be inclined a limited distance in any direction with reference to the mast 9, thus changing the axis of rotation of the two wing systems.

The upper end of the tubular axle member 8 is closed and terminates in a fixed shaft 14 (see Fig. 3) on which is rotatably mounted a hub member 15 to which the upper set of wings 6 are pivotally attached by a ball and socket joint 16 (see Fig. 6). The lower end of the axle member 8 has a second hub member 17 rotatably mounted thereon and held in position between an annular shoulder bearing 18 (see Fig. 5) formed in the exterior wall of the axle member and a ring nut 19 screwed onto the lower end of the tubular axle member. The blades of the lower wing system 7 are pivotally attached to the lower hub member by ball and socket joints 20. An arm or stick 71 extending downward and in front of the pilot's seat is also attached to the axle member 8 for use in tilting the axle member in any desired direction.

The lift forces of the two wing systems will be practically balanced around the universal mounting under all conditions of flight which makes it possible to obtain an easy action for control purposes as will be more fully explained. The universal mounting thus becomes the center of lift (C. L.) of the two wing systems and is located approximately over the center of gravity (C. G.) of the helicopter.

As illustrated in Figs. 6 to 12, each wing system comprises two or more blades each of which has a root member 21 universally pivoted to its respective hub by ball and socket joints. Each blade is driven by a torque arm 22 attached to and extending from its respective hub in front of the blade through a link system comprising a link 23 connecting the end of the torque arm 22 to a depending crank 24 adjustably attached to the root of each blade. The link 23 is universally pivoted to the end of the torque arm 22 (see Fig. 11) by a ball and socket joint 25 and to the lower end of the depending crank 24 by a similar type of joint 26 to permit free universal movement of the blades. The depending crank 24 is permitted to rock a limited distance around the universal joint 26 to change the pitch angle of the blade with reference to its normal plane of rotation. The negative pitch of the blade is limited by a stop 27 (see Fig. 9) formed in the upper edge of the link 23 and the positive pitch of the blade is limited by a stop 28 also formed in the upper edge of the link 23. The maximum negative pitch of the blade will be that necessary to maintain auto-rotation when the wing system is acting as a wind-mill. The maximum positive pitch of the blade will be that necessary to obtain the most efficient lift. Normally the difference will be about eight degrees, depending upon the blade element used and the efficiency desired. As will be noted the link 23 is permitted also to rock a limited distance around its pivot 25 on the end of the torque arm 22. This rocking movement is desirable to obtain automatically a change in the pitch of the blades with reference to plane of rotation to meet changing conditions when the helicopter is in translational flight. In order to equalize the lift between the blade advancing into the wind and the blade receding from the wind, it is very important that the pitch of the advancing blade be reduced and the pitch of the receding blade be increased, and this change in pitch should be automatic. The maximum change in pitch is limited by a stop 29 (Fig. 8) formed in an arm 30 on the end of the torque arm 22, which engages a slot 31 formed in the link 23.

The ring portion of the depending crank 24 which encircles the root of the blade is split and formed as illustrated in Fig. 10 and a bolt 32 is utilized to clamp the crank tightly to the root of the blade. This arrangement permits ready adjustment of the pitch of the blade to meet varying conditions such as operating at high altitudes where the pitch of the blade must be greater than at low altitudes. A spring 33 connects an upward extension of the crank 24 with an upward extension of the link 23 to maintain a negative pitch when no driving torque is applied. When a driving torque is applied the spring gives and permits the blade to attain a positive pitch, which action is automatic.

In operation the blades attain a coning angle, with reference to a plane at right angles to the axis of rotation, which is the resultant of thrust and centrifugal forces acting upon the blades. In hovering flight the normal coning angle will be between about five or six degrees, but when the helicopter begins to move in any direction, the blade advancing into the wind will have a greater lift than the receding blade and the coning angle of the advancing blade will be greater than that of the receding blade, however in order to equalize as much as possible the lift and coning angle of the blades, the linkage system illustrated and described is provided to permit the blades to rock around the pivot 25 in the end of the torque arm 22. Due to the increase in lift forces acting upon the blade advancing into the wind the coning angle increases and the pitch angle decreases until there is a balance between lift and centrifugal forces, conversely, due to the decrease in lift forces acting upon the receding blade the coning angle decreases and the pitch angle increases until there is a balance between lift and centrifugal forces. Due to the short linkage between the torque arm 22 and the blade root the pitch angle varies much more rapidly than the coning angle, thus, if the distance of the link from the pivotal point 16 of the blade is four times greater than the distance between the pivotal points 25 and 26 of the link 23, the change in pitch angle of the blade will be four times the coning angle, that is, if the coning angle varies two degrees the pitch angle will vary eight degrees. This change in pitch angle between advancing and receding blade occurs whether the blades be driven by the engine or whether they are rotating as a windmill. However, occasions may arise in forward flight when the change in pitch angle will be the reverse of that stated above, due to the angle of attack of the plane of rotation with reference to the relative air flow through the blades.

The two wing systems are driven in opposite directions by the engine 2 through the intermediary of a clutch, (not shown) enclosed in the casing 33 attached to the body and supporting the tubular column or mast 9, and a drive shaft 34 passing upwardly through the mast. The drive shaft 34 is connected to another shaft 35 by a double universal joint 36 located above the universal mounting of the tubular axle member 8. The shaft 35 drives a differential spider 65 slidably mounted on the shaft to permit slight endwise movement of the shaft when tilted. The differential spider carries four differential pinions 37 which mesh with and drive upper and lower differential gears 38 and 39 formed in hub members 40 and 41 mounted to rotate on the shaft, 35, one on each side of the differential spider. The upper hub member terminates in a pinion 42 which drives opposed gears 43 mounted on shafts 44, the upper end of which terminate in small pinion gears 45 which mesh with and drive an internal gear 46 attached to the hub member 15 forming a part of the upper wing system. The lower hub member 41 terminates in a pinion 47 which meshes with and drives opposed gears 48 mounted on shafts 49 the lower end of which terminate in pinions 50 which mesh with and drive an external gear 51 formed in the upper bearing end of the hub member 17 forming a part of the lower wing system. This form of differential drive serves to divide the engine torque equally between the two wing systems under all conditions of flight and is a very important feature of this invention. So long as the torque is divided equally between the two wing systems there is no tendency for the body of the helicopter to rotate opposite to that of the greater torque. However, it is my intention in this invention to provide means whereby the torque of the two wing systems may be varied at will by the operator and utilized for directional control purposes, no matter whether the wing systems are being driven by the engine or whether they are rotating as windmills. This is accomplished by attaching to the upper and lower differential gear hubs 40 and 41, brake drums 72 and 73, and applying a braking action to either as desired. The lower brake drum is provided with an external brake band 53, one end of which is attached to the tubular axle member. The other end of the brake band is attached to one arm of a bell crank 54 (see Figs. 4 and 13) mounted to rock on a shaft 55 also carried by the axle member. The other arm of the bell crank is attached to the piston rod of a hydraulic motor 56 which is connected by a flexible tube 57 to a hydraulic pump 58 driven by the right foot pedal 59 in the pilot's cabin. A similar braking device is provided for the upper brake drum 72. It comprises a similar external brake band 52 one end of which is attached to the tubular axle member 8. The other end is attached to one arm of a similar bell crank 60 arranged to rock on the same shaft and in the same manner as the other bell crank 54. The other arm of the bell crank 60 is attached to the piston rod of another hydraulic motor 61 (see Fig. 13) which is connected by a flexible tube 62 to a hydraulic pump 63 driven by the left foot pedal 64 in the pilot's cabin. In Fig. 1 it will be noted that the flexible tubing 57 and 62 pass from the exterior into the interior of the tubular axle member so as not to interfere with the rotation of the lower wing system.

With the differential drive and braking system described above either rotating wing system may be slowed down by the pilot and the other one increased in speed. The reaction from the wing system having the greater driving torque causes the body of the helicopter to turn in the direction opposite to the rotation of the wing system to which the greater driving torque is applied. If no driving torque is applied and the wing systems are rotating in opposite directions as windmills the same braking method is applied for directional control. This method of control also forms a very important feature of this invention and its action will be more fully described.

Referring again to Figs. 1 and 2 a stabilizer or horizontal rudder 5 is provided to maintain fore and aft trim of the helicopter while in forward flight only. The stabilizer 5 is mounted to rotate freely in any direction on a horizontal shaft 66. It is actuated by an auxiliary rudder 67 hinged to the trailing edge of the stabilizer. In other words the two together act as a Fletner rudder. The auxiliary rudder 67 is set to any position by the pilot who operates a fluid pump 69 to build up a fluid pressure which is transmitted from the pump through a tube 70 to a hydraulic motor 68, embodied in the stabilizer, which is connected with and actuates the auxiliary rudder. The full line drawing of the stabilizer in Fig. 1 illustrates one position of the stabilizer and the auxiliary rudder to cause an upward force when the helicopter is moving forward. A downward force may be obtained if the position of the stabilizer and its auxiliary rudder are changed. The direction of the moment of force will vary according to the direction of the wind acting upon the stabilizer and the position of the stabilizer. Since the stabilizer is free to swing around in any position independent of the auxiliary rudder the leading edge will always point in the general direction of the relative wind and will be parallel thereto if the cord of the auxiliary rudder coincides with that of the stabilizer or if the auxiliary rudder is in a neutral position, as indicated by the dotted lines assuming that the relative wind is coming from the direction of the leading edge. The moment the auxiliary rudder is actuated to an angular position to either side of the cord of the stabilizer, a moment of force is set up by the stabilizer acting toward the side to which the auxiliary rudder has been actuated, as indicated by the vector line.

With the arrangement illustrated and described the stabilizer readily adjusts itself to the varying air currents without any action on the part of the pilot regardless of the position of the auxiliary rudder. When the helicopter is hovering or moving slowly the stabilizer does not affect the control of the helicopter due to the slow velocity of relative wind, but when a considerable forward speed is attained the stabilizer may be manipulated to exert a considerable up or down force which may be utilized to tilt the body of the helicopter either forward or backward.

Fig. 1 illustrates the position of the helicopter in normal forward flight. To operate, assume that the helicopter is standing on the ground. In such a position the axis of the drive shaft and the axis of the wing system will be practically vertical. Before starting engine disconnect the wing system by throwing out the clutch 33. After engine has been started throw in the clutch and connect engine with wing system. When a torque is applied to the wing systems they will begin to rotate in opposite directions with the torque evenly divided by virtue of the differential gear. In the drawings, looking down from the top, the engine rotates clockwise, the lower wing system rotates clockwise and the upper wing system rotates anti-clockwise. In order to reduce to a minimum the movement of the differential gear pinions the lower wing is geared to rotate faster than the upper wing system and also has a higher pitch due to the fact that it is operating in the down wash of the upper wing system. As the torque is increased due to speeding up of the engine the blades attain a positive pitch automatically by swinging counter-clockwise around the pivot 26 as indicated by the dotted lines (c) Fig. 7. When the lift force is sufficient the helicopter will rise vertically in the air. If it is desired to move in any direction the axle member 8 is tilted in that direction by moving the handle or stick 71 in an opposite direction. If it is desired to relieve the strain on the drive shaft universal joint 36 (Fig. 3) in continued forward flight due to angular drive through the universal joint, the stabilizer 5 may be actuated to the position necessary to produce a tilting moment necessary to obtain a normal attitude for forward flying such as illustrated. The weather cock 4 assists in maintaining a steady straight flight. Should it be desired to turn to the right, the right foot pedal 59 is depressed which applies the brakes to the lower differential gear 39 (Figs. 3 and 13) and a greater torque to the upper wing system the reaction of which causes the body to turn to the right. If it is desired to turn to the left the left foot pedal 64 is depressed which applies the brakes to the upper differential gear 38 and a greater torque to the lower wing system the reaction of which causes the body to turn to the left. Pushing the stick 71 forward to position indicated by dotted lines (a) causes axis of rotation and position of blades to attain the position indicated by the dotted lines (a'). Pulling the stick back to position indicated by dotted lines (b) causes the axis of rotation and the blades to attain a plane of rotation indicated by the dotted lines (b'). In the same manner the axis of rotation and the plane of rotation may be shifted from side to side for lateral control. Since the two wing systems rotate on the same axle member, which is universally mounted to the body, the universal mounting becomes the center of lift (C. L.) for the two wing systems, which normally should be directly over the center of gravity (C. G.) of the helicopter.

Should the engine stop running or be disconnected from the wing system for any reason the blades will automatically attain a negative pitch as indicated by the dotted lines (d) in Fig. 7, and will continue to rotate in the same direction as a windmill provided the clutch 33 is thrown out to reduce engine drag. When the wings are rotating as windmills the controls are manipulated in the same manner as they are manipulated when driven by the engine.

It is apparent that many modifications in structual arrangement and application of the general principles described herein may be made without departing from the spirit and scope of the following claims.

The invention herein described may be manufactured and used by or for the Government of the United States of America for governmental purposes without the payment of any royalties thereon.

I claim:

1. In an aircraft, two propellers mounted to rotate in opposite directions on an axle member common to both and in spaced relation to each other, and universal mounting means located at a point in the axle member between the two propellers to permit change of direction of axis of said axle member.

2. In an aircraft, two propellers mounted to rotate in opposite directions on the same axis on an axle member common to both, means for universally mounting said axle member at a point between the two propellers to the body of the aircraft to permit articulation of the axle member in all directions, means for driving said propellers, and means for moving said axle member around its universal mounting to change the direction of axis of rotation of the two propellers for control purposes.

3. An aircraft as described in claim 2 and including in said driving means a differential drive to divide the applied torque equally between the two propellers.

4. An aircraft as described in claim 2 and including in said driving means a differential drive to divide the applied torque equally between the two propellers and braking means to vary the torque between the two propellers for control purposes.

5. In an aircraft of the rotative wing type, the combination of a body having a support projecting upwardly therefrom, an axle member universally mounted at a point between the two ends of the axle member to the said support and arranged to be articulated in all directions a limited distance with reference thereto, a rotative wing system mounted on each end of said axle member to rotate in opposite directions, means for driving said wing systems in opposite directions, and means for articulating the axle member to change direction of axis of rotation of the wing systems for control purposes.

6. An aircraft as described in claim 5 and including a differential gear in said driving means to divide the torque equally between the two wing systems and to prevent a reacting torque which would turn the body.

7. An aircraft as described in claim 5 and including a braking means for varying the torques of the oppositely rotating wing systems for directional control purposes.

8. An aircraft as described in claim 5 and including means for dividing the torque equally between the two rotating wing systems and means for varying the torque for directional control purposes.

9. In an aircraft, the combination of a tubular support projecting upwardly from an aircraft body, a tubular axle member encircling said tubular support and universally mounted at a point between its ends to the upper end of the tubular support to rock on an axis parallel with the longitudinal axis of the body and on an axis parallel to the traverse axis of the body, a sustaining and propelling wing system mounted on each end of the axle member to rotate in opposite directions, an engine to drive said wing systems, a power transmission system connecting said engine with said sustaining and propelling wing systems to drive them in opposite directions, and means for tilting said axle member on its universal mounting to change the direction of axis of rotation of the wing systems for control purposes.

10. An aircraft as described in claim 9 wherein the power transmission system includes a differential gear to divide equally the driving torque between the two rotating wing systems.

11. An aircraft as described in claim 9 wherein the power transmission system includes a differential gear to divide equally the driving torque between the two rotating wing systems and braking means to vary the driving torques between the two rotating wing systems for control purposes.

12. In a helicopter control mechanism, the combination of a body having an upward extension from the body, an axle member universally mounted between its ends to the upper end of said extension and arranged to be articulated in any desired direction, a sustaining wing system rotatably mounted on each end of the axle member to rotate in opposite directions, means for applying equal and opposed driving torques to the wing systems, and means for varying the applied torques for control purposes.

13. In a helicopter, the combination of a body and a tubular support projecting upwardly therefrom, a tubular axle member encircling said tubular support and universally mounted at a point between its ends to the upper portion of the tubular support and arranged to be articulated in any desired direction, a sustaining and propelling wing system mounted on each end of the axle member to rotate in opposite directions, an engine for driving said wing systems, a drive shaft extending through said tubular support from the engine, a second drive shaft mounted within the tubular axle above its universal mounting, universal joints connecting the two shafts, a differential spider member on said second drive shaft, differential gears on each side of said spider, differential pinions on said spider member meshing with and driving said differential gears, pinion gears attached to each differential gear and rotating on same shaft, an internal gear attached to the hub portion of the upper wing system, a gear train connecting the upper pinion gear with the upper internal gear, an external gear attached to the hub portion of the lower wing system, a gear train connecting the lower pinion gear with the lower external gear, and a clutch to disengage engine from said wing systems when it is desired that they continue rotation independent of engine torque.

14. A helicopter as described in claim 13 wherein a brake drum is attached to each of the differential pinions and means are provided to apply a braking action to either or both of said drums to slow down or increase the speed of either or both of the rotating wing systems for control purposes.

15. A helicopter as described in claim 13 and including a tail unit having a horizontal rudder or stabilizer which may be manually actuated by the pilot in forward flight to maintain the desired longitudinal trim of the body of the helicopter with reference to relative wind.

SIDNEY P. VAUGHN.